Jan. 23, 1968          D. GILETTA          3,365,192
APPARATUS FOR MAKING AT LEAST A LONGITUDINAL
FOLD ON A MOVING STRIP OF FLEXIBLE MATERIAL
Filed Sept. 2, 1965                    5 Sheets-Sheet 1
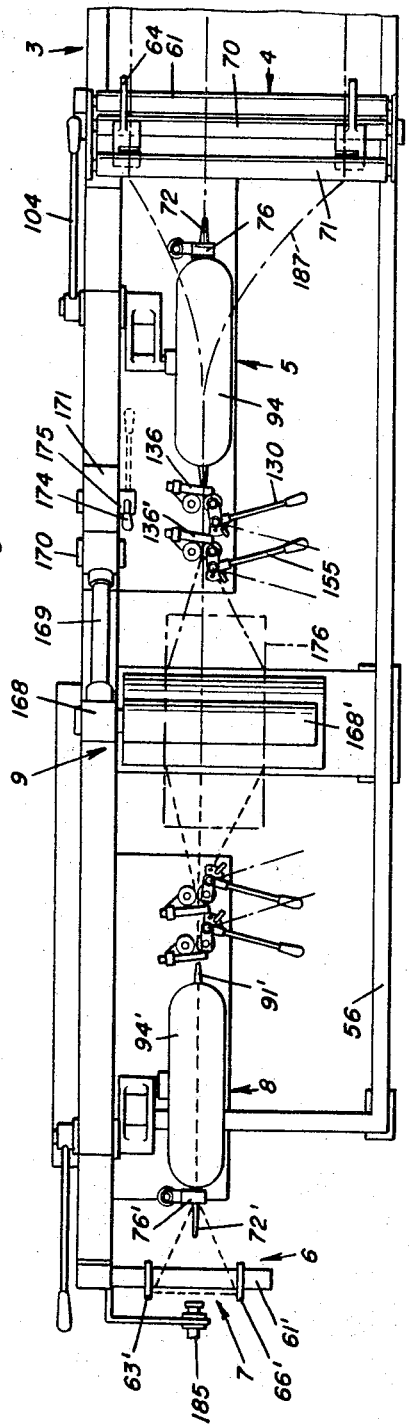
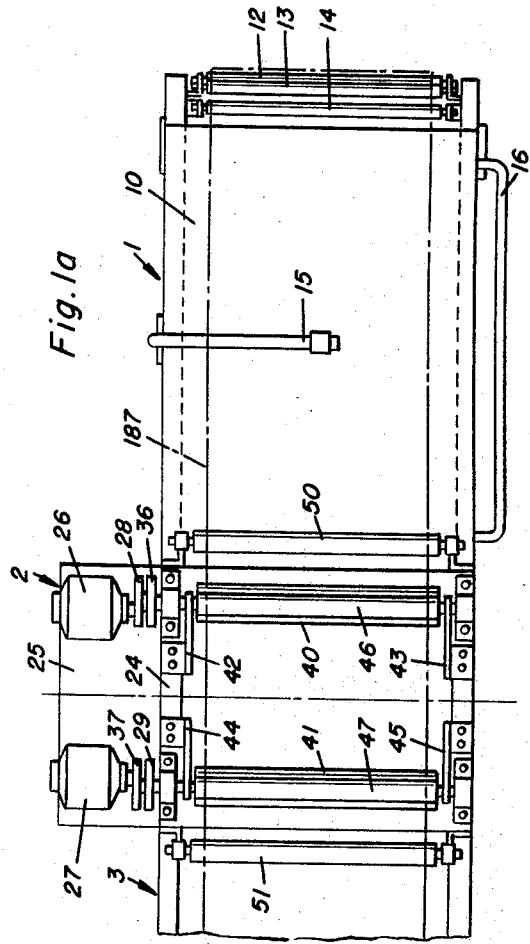
INVENTOR
Dario Giletta
BY
Stevens, Davis, Miller & Mosher
ATTORNEYS

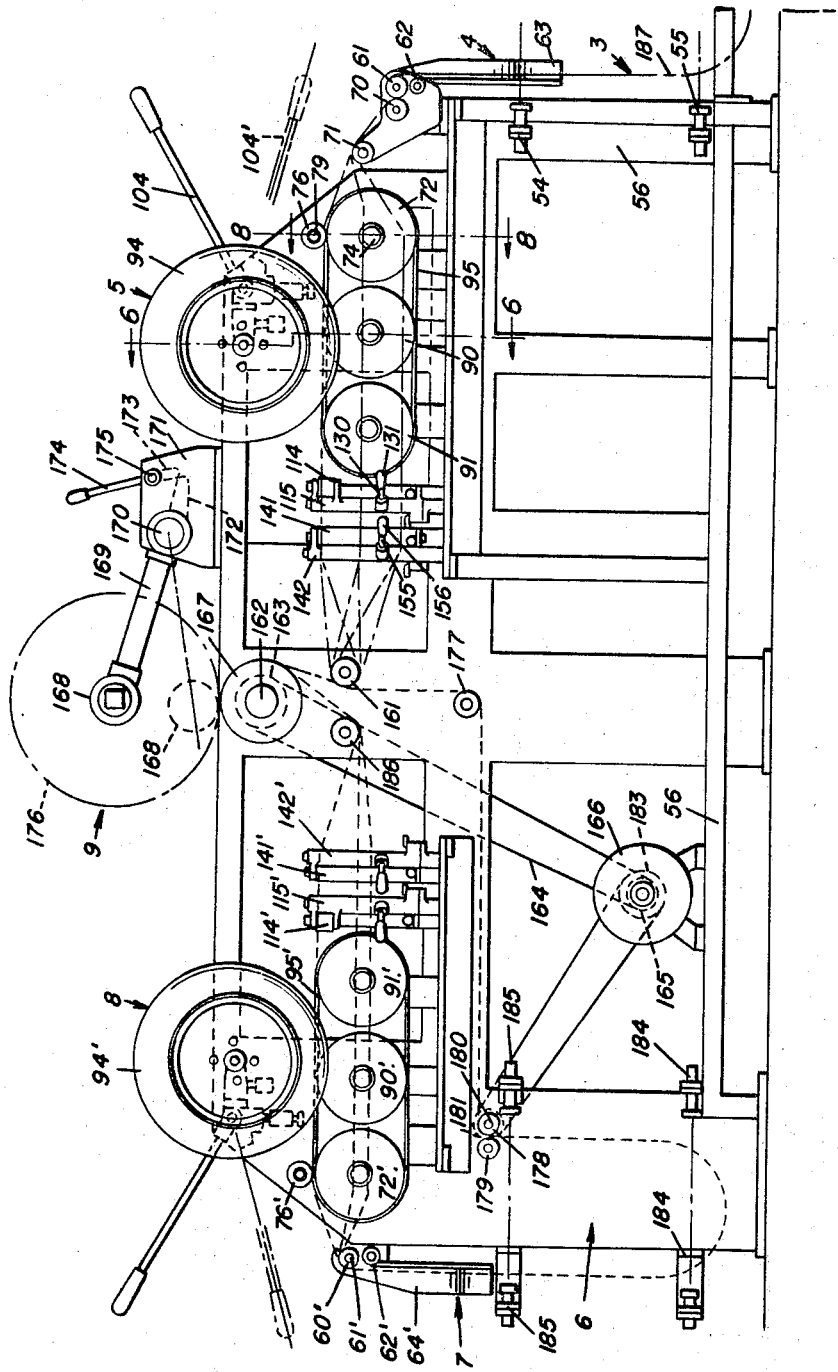

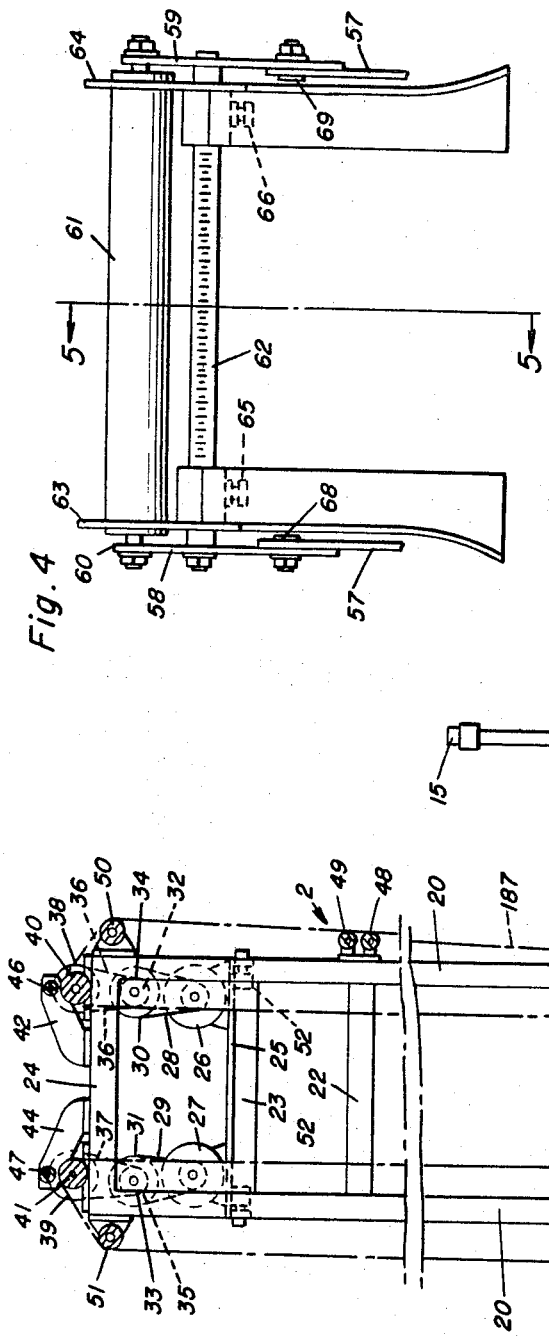

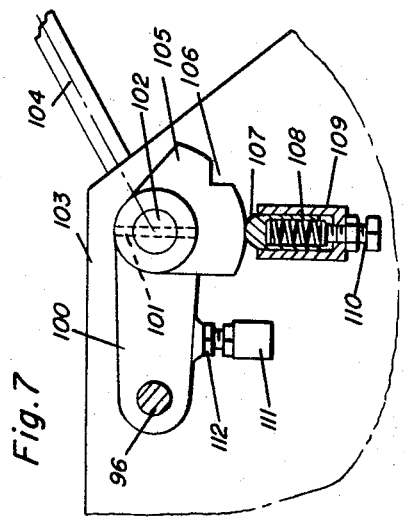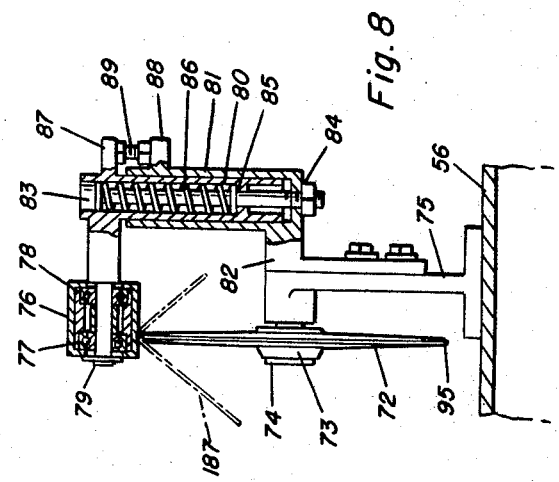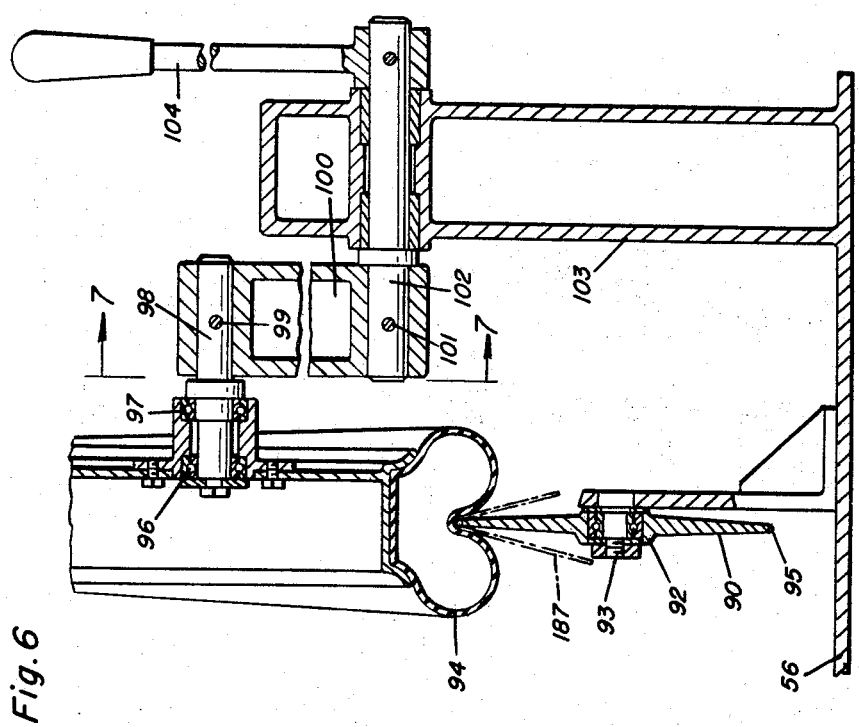

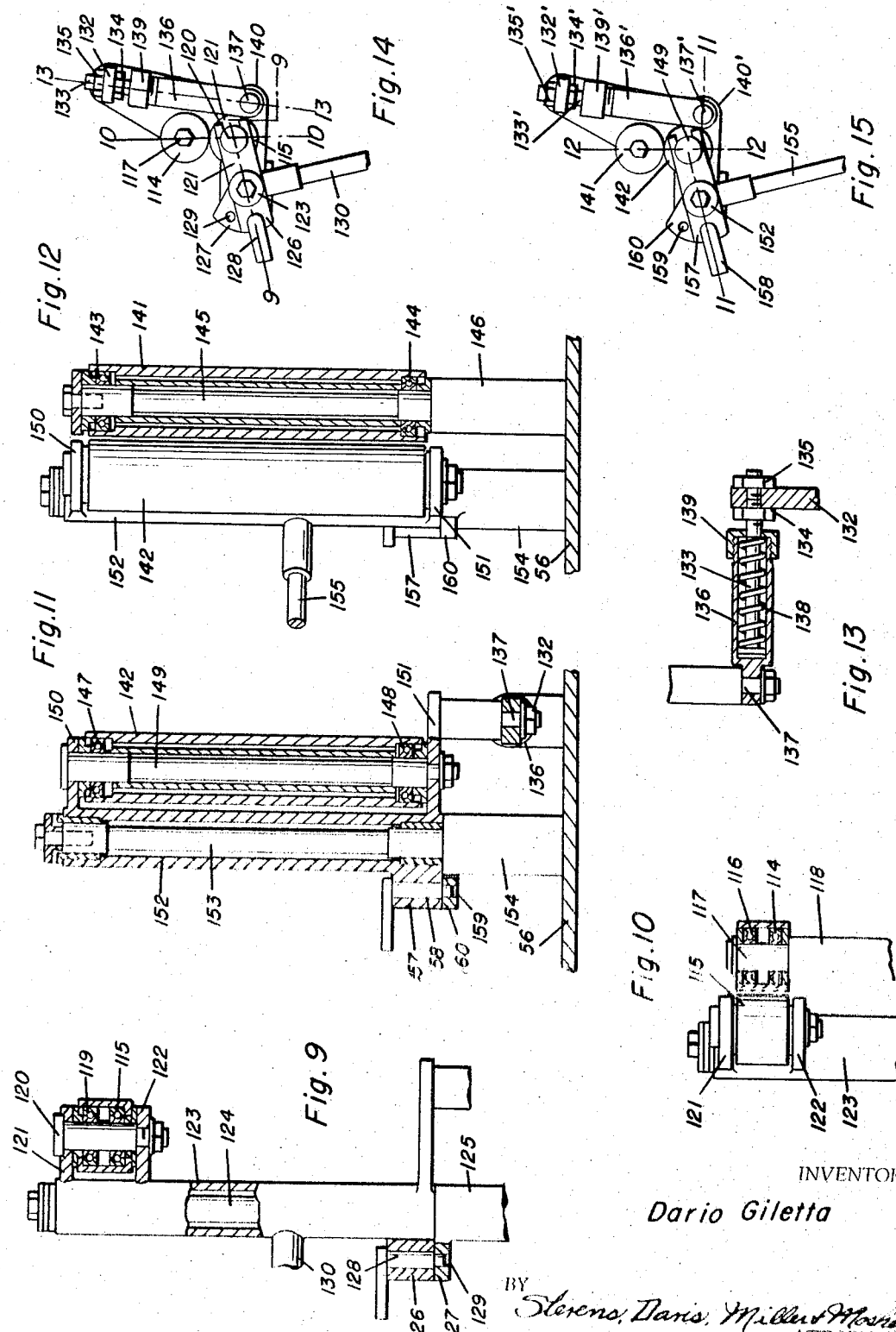

United States Patent Office 3,365,192
Patented Jan. 23, 1968

3,365,192
APPARATUS FOR MAKING AT LEAST A LONGITUDINAL FOLD ON A MOVING STRIP OF FLEXIBLE MATERIAL
Dario Giletta, Milan, Italy, assignor to Pirelli S.p.A., Milan, Italy
Filed Sept. 2, 1965, Ser. No. 484,669
Claims priority, application Italy, Sept. 2, 1964, 18,813/64
13 Claims. (Cl. 270—86)

ABSTRACT OF THE DISCLOSURE

An apparatus for making at least one longitudinal fold on a strip of flexible material, comprising a disc and an annular hollow air tube having a variable inflation pressure mounted on a support means with their axes extending parallel and spaced so that the disc depresses the air tube during operation. The mid-circumferential plane of the tube coincides with the corresponding plane of the disc so that when a strip is advanced between the air tube and the disc, it is folded.

---

The present invention relates to an apparatus for making at least one longitudinal fold on a moving strip of flexible material, and in particular on a strip of rubberized fabric of the weftless or so-called "cord" type to be used as a reinforcing structure in pneumatic tires having a radial carcass.

The reinforcing structures are usually ring-shaped and provided with either two superposed strips, each folded upon itself longitudinally along a line parallel, but displaced with respect to the strip midline, or with a single strip folded twice upon itself longitudinally and always in a direction parallel to the midline.

Due to the required function of this ring-shaped reinforcing structure, it is essential that the distance between the fold and the edges of the strip constituting the structure be constant throughout the length of the strip.

In order to obtain a strip having such requisites, difficulties are encountered in centering the strip during its supply to the folding apparatus, and in folding up said strip, since the cord fabric from which it is formed is likely to deform irregularly inasmuch as it is constituted merely by a bias warp and by rubber in a plastic condition.

The primary object of the present invention is to provide apparatus for making one or more longitudinal folds on a moving strip of flexible material with the greatest precision and without causing irregular deformations of the strip.

This apparatus may embody one or more centering devices which control the position of both edges of the strip, and a folding unit having one or more annular air tubes cooperating with at least a disc, or equivalent elements (as for instance tracked pulleys), contained in the plane passing through the mid-circumferential plane of the air tube, by at least a pair of rollers whose axis is perpendicular to that of the air tube, intended to press to each other the bands of strip adjacent the fold, and by at least a second pair of rollers, parallel to the first and intended to press the folded strip for its whole width.

These and other features of the present invention will be more clearly evident from the following description of a preferred form of embodiment of the same, given by way of non-limiting example, and made with reference to the attached drawings, in which:

FIG. 1 is a top plan view of a portion of apparatus incorporating the present invention;

FIG. 1a is a top plan view of the remaining portion of the apparatus shown in FIG. 1;

FIG. 2 is a front elevational view of the assembly of the folding stations and of the mechanism for winding up the folded strip on an enlarged scale;

FIG. 3 is a front elevational view of the splicing table for the foldable strip and of the first storing festoon therefor;

FIG. 4 is a side elevational view on an enlarged scale of the centering device for the strip to be folded;

FIG. 5 is a section taken along line 5—5 of FIG. 4;

FIG. 6 is a section of the first folding station in the apparatus taken along line 6—6 of FIG. 2;

FIG. 7 is a fragmentary section of a detail taken along line 7—7 of FIG. 6;

FIG. 8 is a vertical section along line 8—8 of FIG. 2;

FIG. 9 is a fragmentary detail view, partially in section and partially in elevation with respect to a control mechanism of a pair of rollers of the folding station;

FIG. 10 is another fragmentary detail view of the control mechanism illustrated in FIG. 9; and taken along the line 10—10 of FIG. 14;

FIG. 11 is a fragmentary detail of a control mechanism shown partly in section and partly in elevation;

FIG. 12 is another fragmentary detail partly in section and partly in elevation taken on line 12—12 of FIG. 15;

FIG. 13 is another fragmentary detail partly in section and partly in elevation on line 13—13 of FIG. 14;

FIG. 14 is a top plan view of the rollers and control mechanism shown in FIG. 10;

FIG. 15 is another top plan view, this being of the rollers and control mechanism shown in FIG. 12;

FIG. 16 shows a section through the strip with one longitudinal fold; and

FIG. 17 is another section through the strip with a plurality of longitudinal folds.

As it may be seen from the general views illustrated in FIGS. 1, 1a, 2 and 3 the embodiment of the present invention, given by way of example, comprises a table 1 for splicing the pieces of bias-cut cord fabric supplied by a shearing machine (not shown in the figures), a principal festoon 2 for storing the fabric strip, an auxiliary festoon 3, a device 4 for centering the strip with respect to the folding units, a first folding station 5, a third festoon 6, a second centering device 7, a second folding station 8 and a group 9 for winding the folding strip.

The table 1 (see FIGS. 1a and 3) is constituted by a top or work surface 10 and by supporting legs 11.

On the work surface 10 there are assembled idle sliding rollers 12, 13, 14 adapted to facilitate the supply of fabric pieces to the splicing table 1. The table 1 is provided with a photoelectric cell 15 for the detection of possible interruptions in the supply of the fabric strip, and with a foot control lever 16 supported by springs 17 to start or to stop the supply of the strip through a microswitch 18. The table 1 also carries an idle roller 19 to maintain the fabric strip in contact with the top 10 of the table 1.

The storing festoon 2 (see FIGS. 1a and 3) comprises a frame constituted by upright members 20 and by ledgers 21, 22, 23 and 24. The ledgers 23 support a horizontal member 25 onto which there are disposed two electric motors 26 and 27, respectively connected, by means of driving belts 28 and 29, to pulleys 30 and 31, keyed on shafts 32 and 33, on which are also keyed pulleys 34 and 35. The pulleys 34 and 35 in turn are connected by means of belts 36 and 37, to pulleys 38 and 39 fixed for rotation with rollers 40 and 41.

To the upper part of the ledgers 24 there are connected arms 42, 43, 44 and 45, supporting respectively idle rollers 46 and 47. The uprights 20 are further provided with idle guiding rollers 48, 49, 50 and 51, and with two photoelectric cells 52 and 53.

The storing festoon 2 is immediately followed by the storing festoon 3 (see FIG. 1), also provided with two photoelectric cells 54 and 55, so as to ensure a regular supply of the strip to the centering device 4.

The centering device (see FIGS. 2, 4 and 5) is secured to the frame 56 by means of a suporting ledger 57, to which are fastened plates 58 and 59. The upper ends of the latter carry a pivot 60, on which a hollow roller 61 is rotatably assembled.

Below the roller 61, and fastened to the plates 58 and 59, there is a graduated scale 62, on which guides 63 and 64, provided with fastening screws 65 and 66, are slidably assembled. The plates 58 and 59 are provided with slits 67 into which may be inserted threaded pins 68 and 69, integral with the supporting ledger 57, which serve to secure to the latter, at the desired level, the roller 61 and the scale 62.

The frame 56 carries horizontal rollers 70 and 71 disposed upstream of the first folding station. This is constituted (see FIGS. 1, 2, and 8) by a thin disc 72, having horizontal axis and assembled, through a ball bearing 73, on a pivot 74 supported by a profile bar 75 integral with the frame 56, and by a roller 76 covered with rubber and assembled, through ball bearings 77 and 78, on a pivot 79 integral with the upper end of a hollow cylinder 80 inserted in a second hollow cylinder 81, which latter cylinder extends upwardly from an arm 82 integral with the profile bar 75. The hollow cylinder 80 is passed through axially by a longitudinally slidable pin 83, having a large head and a threaded lower end, which receives a nut 84.

The hollow cylinder 80 is provided with an inner flange 85 which bears the lower end of a helical spring 86, which surrounds pin 83 and the upper end supports the head of pin 83.

The hollow cylinders 80 and 81 are respectively provided with the ears 87 and 88 connected to each other by means of an adjusting screw 89. The roller 76 is therefore elastically engaged against the disc 72.

The second folding station (see FIGS. 1, 2, 6 and 7) consists of two thin discs 90 and 91 aligned with the disc 72, each of which is assembled, through a ball bearing 92, on a pivot 93 supported by an angle bar secured to the frame 56, and by an annular air tube 94, the mid-circumferential plane of which coincides with the plane of the discs 90 and 91. The disc 72 of the first folding station and the discs 90 and 91 of the second folding station are connected to one another by means of a belt 95, usually made of textile or metallic cord and encased within grooved peripheral edges of the discs. The air tube 94 is rotatably assembled, through ball bearings 96 and 97, on the pivot 98 which is inserted and secured with a pin 99 in a fork element 100, into which is inserted and secured with a pin 101 a second pivot 102 carried in a support 103, mounted on frame 56, in such a way as to rotate about its own axis. A lever 104 is secured to the end of the pivot 102 opposite that to which the fork element 100 is fastened. Also integral with the lever 104 and with the fork element 100, is a sector 105 provided with a notch 106 to receive a pawl 107, pushed towards the sector 105 by a previously compressed helical spring 108 inserted in a cylinder 109 integral with the frame 56. The compression of the spring 108 may be adjusted by means of a screw 110 providing a stop for an end of spring 108. A support 111, integral with the frame 56, supports the fork element 100 when the air tube is engaged against the discs 90 and 91.

The height of the support may be adjusted by varying the position of nut 112 on threaded pin 113. However, to maintain the air tube disengaged from the discs 90, 91, the lever 104 is rotated in clockwise direction, so that the pawl 107 engages in the notch 106.

The third folding station (see FIGS. 1, 2, 9 and 10) comprises a pair of rollers 114 and 115, having vertical axis of a height less than the width of the folded strip. The idle roller 114, through ball bearings 116 is assembled on a pivot 117 supported by a rod 118 integral with frame 56. The roller 115, through ball bearings 119, is assembled in idle position on pivot 120 inserted in fork elements 121 and 122 integral with a bushing 123, which in turn is mounted on pivot 124 carried by support 125 secured to frame 56.

An ear 126 is provided on the outer surface of the bushing 123 and an extension 127 is provided on support 125.

A pivot 128, displaceable by gravity into one of the holes 129 provided in extension 127, is inserted in the ear 126.

Integral with the bushing 123 there is provided a lever 130, with a handle 131, to control the rotation of bushing 123 about the pivot 124 in order to engage or disengage the roller 115 from the roller 114.

The frame 56 also carries a support 132 (see FIG. 14), which bears a pivot 133, having a threaded end which threadedly receives nuts 134 and 135.

A cylinder 136, rotatably connected at one end on pivot 137, is mounted on the pivot 133. A previously compressed helical spring 138 surrounds the pivot 133; and bears at one end on the head of pivot 133 and at the other end bears against a nut 139 threadedly mounted on the free end of cylinder 136. A pivot 137 is integral with a shackle 140, integral in turn with the bushing 123. Clockwise rotation of the lever 130 disengages the roller 115 from the roller 114 and causes a further compression of the spring 138 as a result of the sliding of the cylinder 136, which moves away from the support 132.

The fourth folding station (see FIGS. 2, 11, 12 and 15) comprises, like the third station, two rollers 141 and 142, having a vertical axis of a height at least equal to the entire width of the folded strip.

The idle roller 141, through ball bearings 143 and 144, is assembled on a pivot 145 supported by support 146 integral with the frame 56, while the roller 142, through the ball bearings 147 and 148, is assembled on the pivot 149, inserted in elements 150 and 151, integral with a bushing 152 surrounding a pivot 153 carried by support 154 secured to the frame 56.

A lever 155, provided with a handle 156, and an ear 157 are integral with bushing 152. A pivot 158 which descends by gravity into hole 159 of an extension 160 of the support 154, is inserted in ear 157.

Also the fourth folding station comprises an assembly like that shown in FIG. 14; that is, a support 132′, carrying a pivot 133′, having a threaded end onto which threadedly mounted two nuts 134′ and 135′. A cylinder 136′ is inserted on pivot 133′ and is rotatably mounted at one end of the pivot 137′ secured to the shackle 140′ which is secured to bushing 152. A helical spring like the helical spring 138 is encased in the manner shown in FIG. 13 inside cylinder 136′.

Between the fourth holding station and the group 9 for winding up the folded strip, there is an idle guiding roller 161 supported by the frame 56. Onto a shaft 162, also assembled on the frame 56, there is keyed a pulley 163 which, through chain 164 and pulley 165, is connected to a driving shaft 166 secured on the base of the frame 56.

The group 9 for winding up the folded strip (see FIGS. 1 and 2) comprises a roller 167 keyed on the shaft 162 and a roller 168 rotatably assembled on one end of a lever 169, the other end of which is pivoted in a pivot 170 inserted in a support 171 integral with the frame 56. The lever 169 is provided with an extension 172 which engages against extension 173 of a control lever 174, also pivotally mounted on a pivot 175 mounted on a support 171.

The reference numeral 168′ indicates the position of the roller 168 in contact with the roller 167 before initiating the winding up of the folded strip; that is, the formation of roll 176.

The apparatus represented in the figures may also serve to carry out a second fold on the same strip. For this purpose, a festoon 6, a centering device 7 and a folding station 8 are provided.

Three rollers 177, 178 and 179 assembled on the frame 56 are provided for supplying the strip, already provided with a fold, to the festoon 6 (see FIGS. 1 and 2). Rollers 177 and 179 are idle, while roller 178 is keyed on a shaft 180, on which is also keyed a pulley 181 which, through chain 182, is connected to pulley 183, keyed on the shaft of a motor 166. The festoon 6 is provided with two photoelectric cells 184 and 185, which control the supply of thes strip to centering device 7. This latter like the centering device 4, is secured at the opposite end of the frame 56 and is also provided with a pivot 60', on which is inserted a hollow roller 61', and with a graduated scale 62', on which two guides 63' and 64' are slidably assembled. The second folding assembly is equal and symmetrical to the first; therefore the corresponding parts have been marked with the same prime reference numerals, and further description is deemed superfluous.

In order to guide the strip 187, provided with both desired folds, to the winding up unit, there is a roller 186 supported by the frame 56.

To set up the above described apparatus, the strip 187 is caused to pass on the splicing table 1, through festoons 2 and 3, whose length is suitably adjusted. Then, on the centering device 4 between the guides 63 and 64 secured in the desired position by means of the screw 65 and 66. Next, on the disc 72, from which the roller 76 is temporarily detached by means of the screw 89. Then, on the discs 90 and 91, from which the air tube 94 is temporarily removed by rotating the lever 104 clockwise (which takes the position 104' of FIG. 2) and by engaging the pawl 107 in the notch 106. It moves between the rollers 114 and 115, which are temporarily detached from each other by rotating the lever 130 clockwise and which is secured in the new position by the descent of the pivot 128 in the hole 129 (visible in FIG. 9). Then it passes between the rollers 141 and 142, also temporarily detached from each other by rotating the lever 155 clockwise so as to drop the pivot 158 in the hole 159. It moves about the roller 161 and between the rollers 167 and 168, temporarily detached by rotating the lever 174 clockwise which, with its extension 173, engages on the extension 172 on the lever 169 and raises the roller 168.

When it is desired to make a second fold on the strip, the latter is caused to pass from the roller 161 to the roller 177; between the rollers 178 and 179; through the festoon 6 and the centering device 7; and finally, after having been inserted between the roller 76' and the disc 72', between the air tube 94' and the discs 90' and 91', and between the pairs of rollers 114', 115' and 141', 142', the strip is caused to pass about the roller 186 and between the rollers 167 and 168.

In the operation of the above described apparatus, the pieces obtained by cutting on the bias a cord fabric are supplied from the cutter to the table 1 and are spliced together by an operator to form a continuous strip 187. If the splicing is interrupted, the photoelectric cell 15 stops the motor 26 which supplies the storing festoon 2. By actuating the foot control lever 16, it is possible, through the microswitch 18, to reactuate the motor 26 or to stop it in case of emergency.

The strip 187 travels along the work surface 10, with which it is maintained in contact by means of the roller 19, and then passes on the rollers 48, 49 and 50, between the pair of rollers 40, 46, and is stored in the festoon 2. In this festoon the forward motion of the fabric strip is controlled by the photoelectric cells 52 and 53 so that if the strip 187 goes down below the level of the cell 53, the latter stops the motor 26 which supplies the festoon 2. However, if the strip 187 rises above the level of the photoelectric cell 52, the latter stops the motor 27 which supplies the auxiliary festoon 3. The speed of the motor 26 is approximately twice that of the motor 27 to recover the time during which the strip is to be kept stationary upstream the motor 26 to allow the splicing of the pieces constituting it.

From the festoon 2 the strip 187 passes between the pair of rollers 41 and 47 and on the roller 51, thus forming the festoon 3, through which the centering device 4 is supplied. The festoon 3 is controlled by the photoelectric cells 54 and 55.

If the strip 187 goes down below the level of the photoelectric cell 55, the latter stops the motor 27. However, if the strip 187 rises above the level of the photoelectric cell 54, the latter stops the motor 166 which moves the strip forward at the same speed as the motor 27.

In the centering device 4 the strip 187 is caused to pass between the centering guides 63 and 64 and then between the hollow roller 61, assembled on the pivot 60, and the roller 70. From this roller the strip passes to the first folding station through the roller 71.

When the strip 187 reaches the disc 72, it is elastically pressed against the edge of this disc by means of the roller 76 and, because of its own weight and the tension caused by the dragging motor 166, its skirts projecting outwardly of the disc 72 are partially bent downward.

In the second folding station, the inclined skirts of the strip 187 are gently pushed towards the faces of the discs 90 and 91 by the air tube 94. In the third folding station the pair of rollers 114 and 115 presses and let stick to each other the two bands of the strip 187 contiguous to the fold. In the fourth folding station the pair of rollers 141 and 142 presses and completely let stick to each other the two skirts of the strip delineated by the fold.

When a single longitudinal fold of the strip 187 is required, the strip is passed from the folding unit 5 below the roller 161 and then between the rollers 167 and 168, and is wound up about the latter, forming a roll 176.

On the other hand, when the strip is to be provided with a second longitudinal fold, it passes on the roller 161, below the roller 177 and then between the two rollers 178 and 179 and forms a third festoon 6, which supplies the centering device 7. The festoon 6 is provided with two photoelectric cells 184 and 185. The first of these stops the motor 27 when the strip 187 goes down below the level of the phtotoelectric cell 184, while the photoelectric cell 185 stops the motor 166 if the strip 187 rises completely over the level of photoelectric cell 185. The strip 187 is then supplied to the centering device 7 and is caused to pass through the folding station 8, where it is subjected to a second folding operation according to a process equal to that of the folding station 5. At its exit from folding station 8, the strip 187 passes below the guiding roller 186 and then between the rollers 167 and 168, to originate the roll 176.

By means of the apparatus described in the present invention, it is possible to obtain a strip folded exactly as required. This strip, in fact, being initially folded between the discs and the annular air tube coupled to them, is not subjected to deformations since the air tube, inflated at a relatively low pressure, presses the strip gently against the discs, delineating however the fold distinctly, and only later on the strip is pressed between the pairs of rollers to let stick to each other the two parts divided by the fold.

What is claimed is:

1. Apparatus for making at least one longitudinal fold on a strip of flexible material, said apparatus comprising generally elongated support means, an annular hollow air tube mounted on said support means for rotation about its axis, at least one disc mounted on said support means for rotation about its axis, the mid-circumferential plane of said tube coinciding with the corresponding plane of the disc, the axes of said air tube and said disc being spaced so that said disc depresses said air tube during operation, means for adjustably varying the air pressure in said air tube, and means for advancing said strip forward in the direction of its length between said air tube and disc to fold said strip.

2. Apparatus as in claim 1, including at least one pair of rollers carried by said support means disposed downstream of the air tube and the disc cooperating therewith, the axis of said rollers being substantially normal to the axis of said air tube.

3. Apparatus as in claim 2, including at least one pair of said rollers having a width less than that of the folded strip passing between them, and at least one pair of rollers having a width at least equal to that of said folded strip.

4. An apparatus as in claim 1 comprising a centering device for the strip disposed upstream of the air tube and carried by said support means.

5. An apparatus as in claim 1 comprising at least one storing festoon for the strip disposed upstream the air tube and carried by said support means.

6. An apparatus as in claim 5, comprising a splicing table connected to said support means for splicing the pieces intended to constitute the continuous strip, a photoelectric cell for interrupting the forward movement of the strip downstream of said cell on said table, and means associated with said table to control said forward movement, said table being disposed upstream of said storing festoon.

7. Apparatus as in claim 1, comprising a plurality of discs each having a horizontal axis carried by said support means and disposed side-by-side and on the same plane, said discs each being provided with a peripheral groove and being connected to one another by means of an endless flexible element inserted in said groove, two of said discs cooperating with said air tube, said mid-circumferential plane coinciding with that of said discs, means being provided to impart to the air tube two permanent positions, one corresponding to the engagement with said two discs and the other to the complete disengagement of the same, two pairs of rollers having vertical axes, one of said rollers having smaller width and the other a width at least equal to that of the folded strip, means being provided to mutually detach the rollers of the same pair and other means being provided to bring them automatically again in mutual contact.

8. Apparatus as in claim 7, in which the first of said discs cooperates with a roller having horizontal axis and normally pressed elastically against the upper edge of said disc.

9. Apparatus as in claim 1, including a centering device provided with means adjustable at will to limit the travel of the strip at both sides of the latter.

10. Apparatus as in claim 1, including a plurality of assemblies of elements for folding said strip.

11. Apparatus as in claim 1, wherein said discs are each provided with a peripheral groove and further comprising an endless flexible element inserted in said grooves to connect said discs to one another.

12. Apparatus as in claim 3, further comprising an elastic acting locking member adapted to hold the rollers of each of said pair of rollers in mutual contact, and means to overcome the action of said locking element to mutually detach the rollers of each pair of said rollers.

13. Apparatus as in claim 1, wherein said means to advance said strip is disposed externally of said air tube.

References Cited

UNITED STATES PATENTS

| | | | |
|---|---|---|---|
| 2,547,039 | 4/1951 | Pechy | 226—43 |
| 3,019,016 | 1/1962 | Brey | 156—465 X |
| 3,163,343 | 12/1964 | Zernov | 226—199 |
| 3,202,066 | 8/1965 | Palmer | 270—94 X |
| 3,297,315 | 1/1967 | Kunz | 270—86 |

EUGENE R. CAPOZIO, *Primary Examiner.*

P. WILLIAMS, *Assistant Examiner.*